(12) United States Patent
Seo

(10) Patent No.: US 8,888,128 B1
(45) Date of Patent: Nov. 18, 2014

(54) AIRBAG FOR VEHICLE

(71) Applicant: HYUNDAI MOBIS Co., Ltd., Yongin-si (KR)

(72) Inventor: Young Duk Seo, Yongin-si (KR)

(73) Assignee: HYUNDAI MOBIS Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/217,622

(22) Filed: Mar. 18, 2014

(30) Foreign Application Priority Data

Jul. 3, 2013 (KR) .......................... 10-2013-0077970

(51) Int. Cl.
*B60R 21/276* (2006.01)
*B60R 21/239* (2006.01)

(52) U.S. Cl.
CPC .................................... *B60R 21/239* (2013.01)
USPC ........................................ 280/739; 280/743.2

(58) Field of Classification Search
USPC .............................................. 280/739, 743.2
See application file for complete search history.

(56) References Cited

U.S. PATENT DOCUMENTS

| | | | | |
|---|---|---|---|---|
| 6,095,557 | A * | 8/2000 | Takimoto et al. | 280/739 |
| 7,878,542 | B2 * | 2/2011 | Unno et al. | 280/743.2 |
| 8,267,425 | B2 * | 9/2012 | Chida et al. | 280/736 |
| 8,491,004 | B2 * | 7/2013 | Mendez et al. | 280/739 |
| 8,590,927 | B2 * | 11/2013 | Mendez et al. | 280/739 |
| 2007/0170710 | A1 * | 7/2007 | Bouquier | 280/739 |
| 2008/0023950 | A1 * | 1/2008 | Kalczynski et al. | 280/739 |
| 2009/0020991 | A1 * | 1/2009 | Abe et al. | 280/739 |
| 2009/0039630 | A1 * | 2/2009 | Schneider et al. | 280/740 |
| 2010/0109303 | A1 * | 5/2010 | Abe et al. | 280/739 |
| 2012/0299277 | A1 * | 11/2012 | Fischer et al. | 280/739 |

FOREIGN PATENT DOCUMENTS

KR   10-2013-0050657 A   5/2013

* cited by examiner

*Primary Examiner* — Drew Brown
(74) *Attorney, Agent, or Firm* — Sherr & Jiang, PLLC

(57) ABSTRACT

The present invention relates to an airbag for a vehicle, including: an airbag cushion which has a vent hole formed to discharge gas flowing into the airbag cushion to the outside; a vent guide which has a guide hole formed to guide the gas flowing into the airbag cushion to the vent hole, and is disposed in the airbag cushion; and a vent cover which is disposed between the vent guide and the airbag cushion, allows the guide hole and the vent hole to be opened at an initial period of deploying the airbag cushion and at a final period of deploying the airbag cushion, and allows at least one of the guide hole and the vent hole to be closed during an intermediate period of deploying the airbag cushion.

17 Claims, 11 Drawing Sheets

30a

30b

AIRBAG FOR VEHICLE

CROSS-REFERENCE TO RELATED APPLICATIONS

The present application claims priority to Korean Patent Application Number 10-2013-0077970 filed Jul. 3, 2013, the entire contents of which the application is incorporated herein for all purposes by this reference.

TECHNICAL FIELD

The present invention relates to an airbag for a vehicle, and more particularly, to an airbag for a vehicle in which a plurality of vent functions may be integrated and achieved.

BACKGROUND

An airbag for a driver, an airbag for a front passenger seat, and the like, which are deployed toward occupants when a vehicle collision accident occurs so as to reduce injury to upper bodies, faces, and the like of the driver and the occupants, are now generally installed in most of vehicles.

The airbag for the front passenger seat needs to be deployed in order to reduce injury to a neck and/or a head of an occupant even when the occupant such as a child aged three to six years old, or an old person is in an out of position (OOP) state.

In this case, when the airbag cushion is instantaneously deployed with high-pressure gas, the deployed airbag cushion may be more dangerous to the occupant at the time the airbag cushion is fully deployed and the fully deployed airbag cushion comes into contact with a head portion of the occupant because the occupant may be injured by the fully deployed airbag cushion.

Therefore, in recent years, a vent is formed at the airbag cushion, and air is discharged through the vent when the airbag cushion is deployed. The vent is formed to discharge gas in the airbag cushion to the outside in order to prevent a neck, a head, and the like of the passenger from being injured when the passenger collides with the airbag cushion.

As the vent, there are an active vent, a low risk deployment (LRD) vent, and the like. The LRD vent is opened at an initial period of deploying the airbag cushion so as to allow a part of gas flowing into the airbag cushion to be discharged to the outside, the active vent and the LRD vent are closed during an intermediate period of deploying the airbag cushion so as to facilitate the deployment of the airbag cushion, and the LRD vent are maintained in a closed state and the active vent is opened at a final period of deploying the airbag cushion so as to allow a part of gas flowing into the airbag cushion to be discharged to the outside through the active vent, thereby reducing injury to the occupant. Meanwhile, the active vent is opened when an active vent tether, which is connected to the active vent, is cut by a signal transmitted from a tether released unit (TRU).

However, the aforementioned airbag cushion needs to include both the active vent and the LRD vent such that a cushion structure is complicated, and the number of components is increased, thereby causing a manufacturing process to be difficult, and increasing manufacturing costs.

In addition, constituent components of the TRU need to be additionally provided to open and close the active vent, thereby increasing costs.

SUMMARY

The present invention has been made in an effort to provide an airbag for a vehicle which has a simple structure and may protect an occupant by improving a vent system.

Technical problems of the present invention are not limited to the aforementioned technical problems, and other technical problems, which are not mentioned above, may be clearly understood by those skilled in the art from the following descriptions.

An exemplary embodiment of the present invention provides an airbag for a vehicle, including: an airbag cushion which has a vent hole formed to discharge gas flowing into the airbag cushion to the outside; a vent guide which has a guide hole formed to guide the gas flowing into the airbag cushion to the vent hole, and is disposed in the airbag cushion; and a vent cover which is disposed between the vent guide and the airbag cushion, allows the guide hole and the vent hole to be opened at an initial period of deploying the airbag cushion and at a final period of deploying the airbag cushion, and allows at least one of the guide hole and the vent hole to be closed during an intermediate period of deploying the airbag cushion.

The airbag for a vehicle according to the present invention may include: a first cord which has one end portion connected to one side of the vent cover by a first connecting portion, and the other end portion connected to the airbag cushion, and may further include and a second cord which has one end portion connected to the other side of the vent cover by a second connecting portion, and the other end portion connected to the airbag cushion.

The first cord and the second cord may be disposed to be opposite to each other on the basis of the vent cover, the first cord may be connected to a front surface side of the airbag cushion, and the second cord may be connected to a rear surface side of the airbag cushion.

Meanwhile, a part of the vent cover may include a protruding portion that protrudes to the outside of the vent hole before the airbag cushion is deployed, the protruding portion may be inserted into the vent hole so as to close the guide hole by tension applied to the first and/or second connecting portions during the intermediate period of deploying the airbag cushion, and when a predetermined amount or more of tension is applied to the first cord and/or the second cord, the first and/or second connecting portions may be broken to open the guide hole.

When the first and/or second connecting portions are broken, a part of the vent cover may protrude to the outside of the vent hole by gas pressure in the airbag cushion, and the gas may be discharged through the vent hole.

A width or a diameter of the vent hole may be greater than a width or a diameter of the guide hole, and a width of the vent cover may be smaller than a width or a diameter of the vent hole, and greater than a width or a diameter of the guide hole.

One or more than one vent holes and one or more than one guide holes may be formed, portions of the vent cover and the vent guide, which are positioned between the vent holes and between the guide holes, may be connected to a front surface side of the airbag cushion by stitching, and an edge of the vent guide may also be connected to the front surface side of the airbag cushion by stitching.

The vent hole may be formed in a circular shape, an elliptical shape, or a square shape, the guide hole may be formed in a circular shape, and the vent cover may be formed in a rectangular shape.

More specific matters of other exemplary embodiments are included in the detailed description and the drawings.

According to the airbag for a vehicle of the present invention, there are one or more effects as follows.

When the airbag for a vehicle of the present invention is applied, injury to a neck and/or a head of a passenger may be reduced and damage may be minimized even when the passenger such as a child aged three to six years old, or an old person is in an out of position (OOP) state.

Components relevant to an LRD vent and/or an active vent of a cushion assembly are eliminated, thereby reducing a weight.

Processes of assembling a tether released unit (TRU), a TRU mounting clip, and the like are omitted, thereby reducing a weight of the airbag, and manufacturing costs.

The effects of the present invention are not limited to the aforementioned effects, and other effects, which are not mentioned above, will be clearly understood by those skilled in the art from the claims.

DETAILED DESCRIPTION

Figure 1:
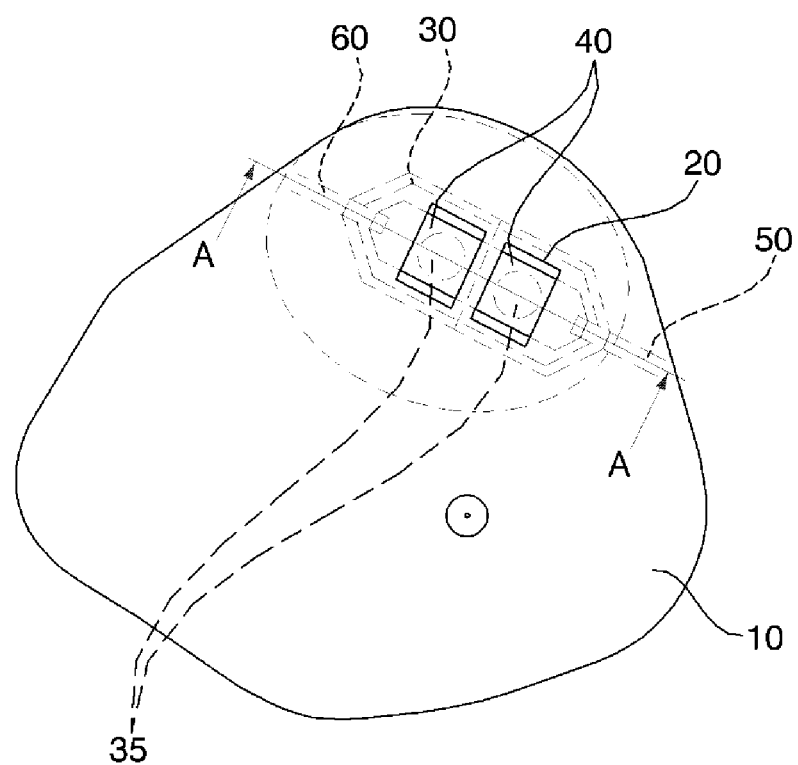
FIG. 1 is a front view illustrating a state when an airbag cushion of a first exemplary embodiment of an airbag for a vehicle according to the present invention is initially deployed.

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are for rendering the description of the present invention complete and are set forth to provide a complete understanding of the scope of the invention to a person having ordinary skill in the technical field to which the present invention pertains, and the present invention will only be defined by the scope of the claims. Like reference numerals indicate like elements throughout the specification.

Hereinafter, the present invention will be described with reference to the drawings for explaining an airbag for a vehicle according to exemplary embodiments of the present invention.

The exemplary embodiments of an airbag for a vehicle may be modified by those skilled in the art.

Figure 2:
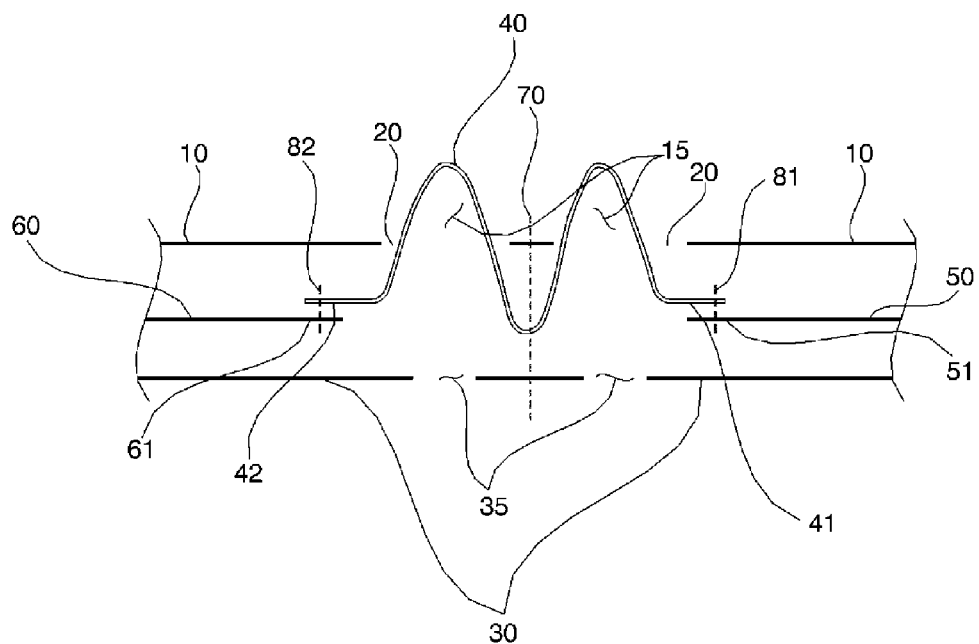
FIG. 2 is a cross-sectional view taken along line A-A of FIG. 1.
Figure 3:
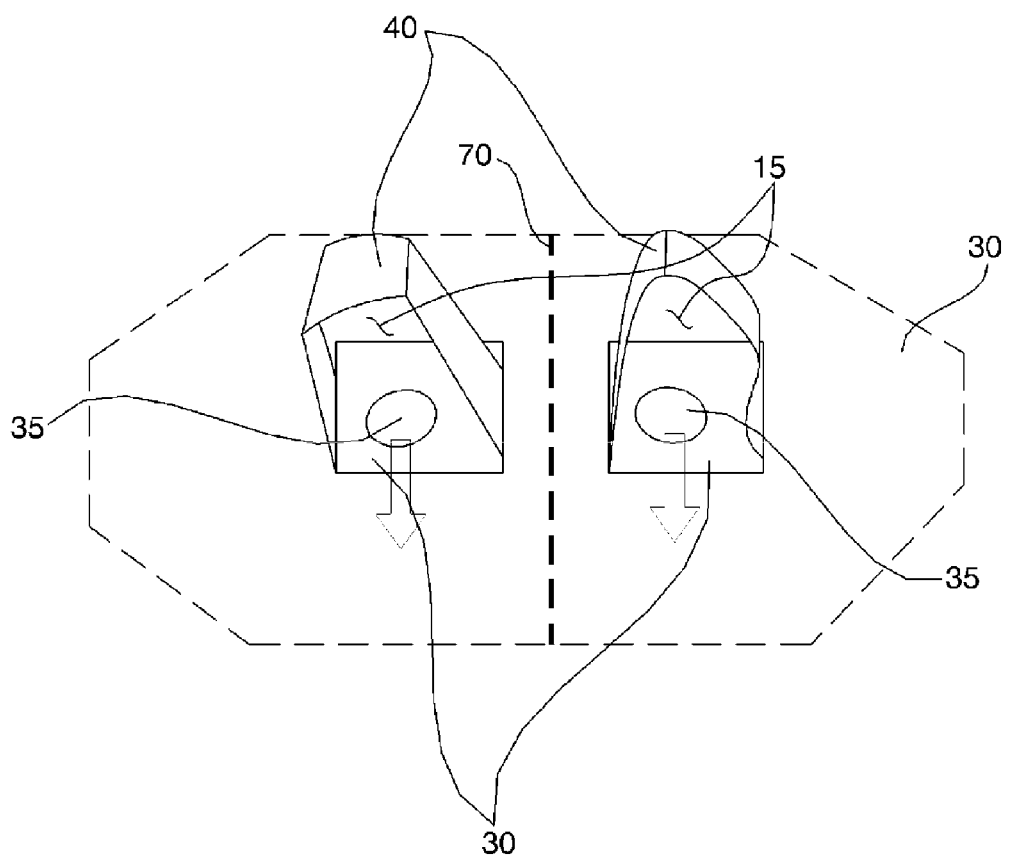
FIG. 3 is a partially enlarged view illustrating a state in which a part of FIG. 1 is enlarged.
Figure 4:
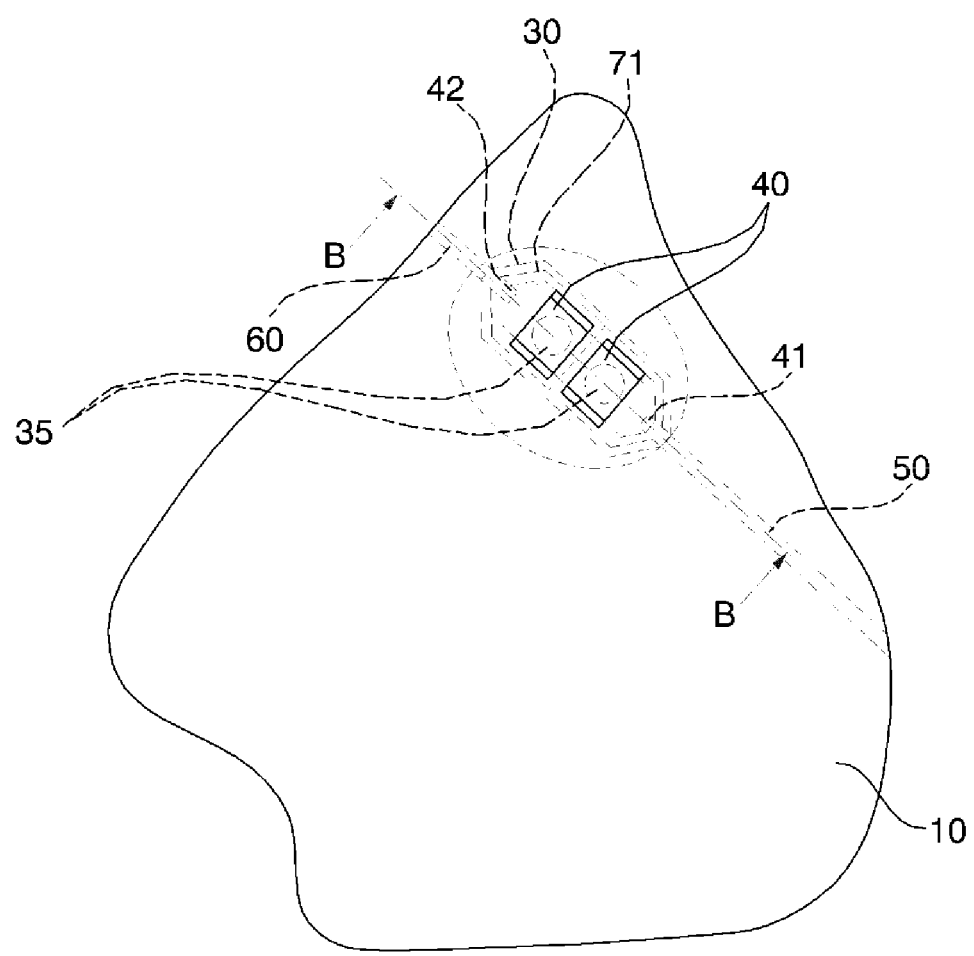
FIG. 4 is a front view illustrating a state in which the airbag cushion of FIG. 1 is being deployed.
Figure 5:
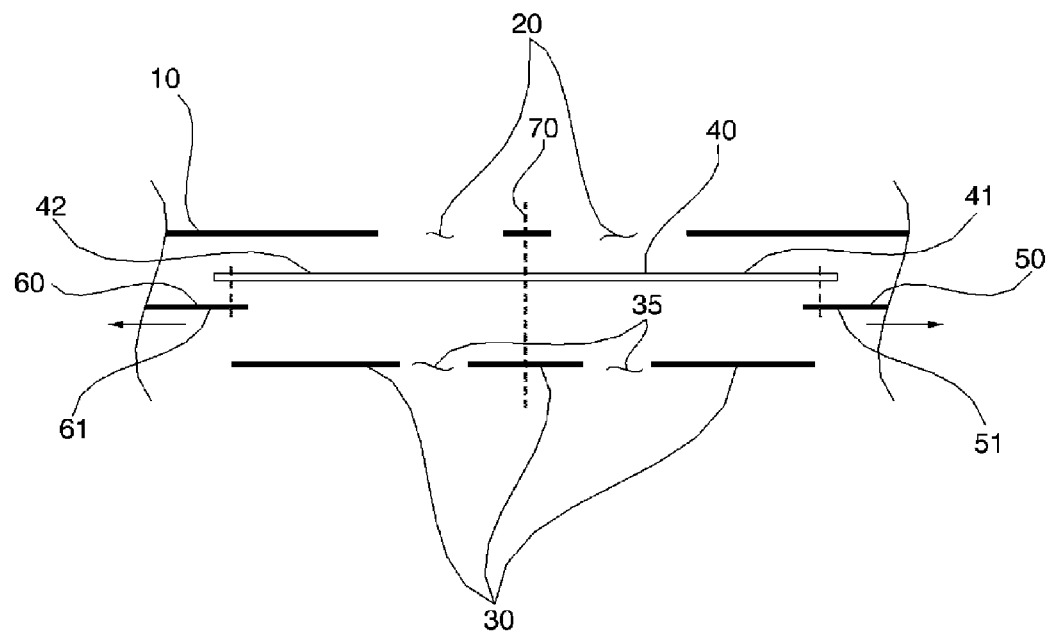
FIG. 5 is a cross-sectional view taken along line B-B of FIG. 4.
Figure 6:
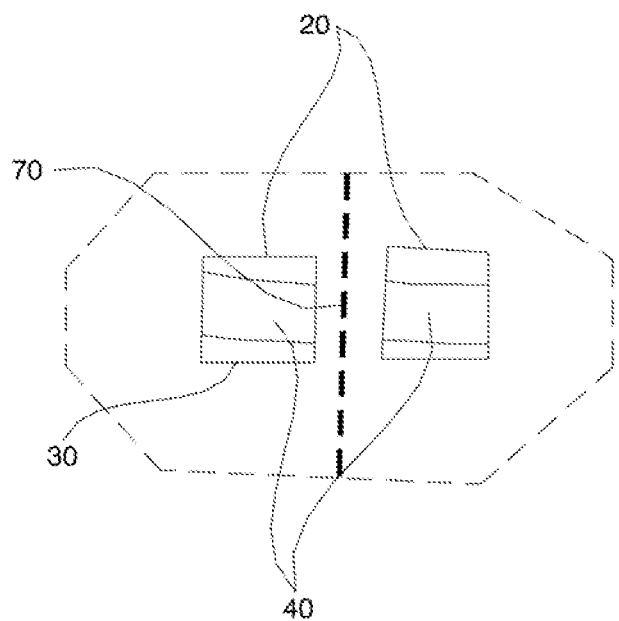
FIG. 6 is a partially enlarged view illustrating a state in which a part of FIG. 4 is enlarged.
Figure 7:
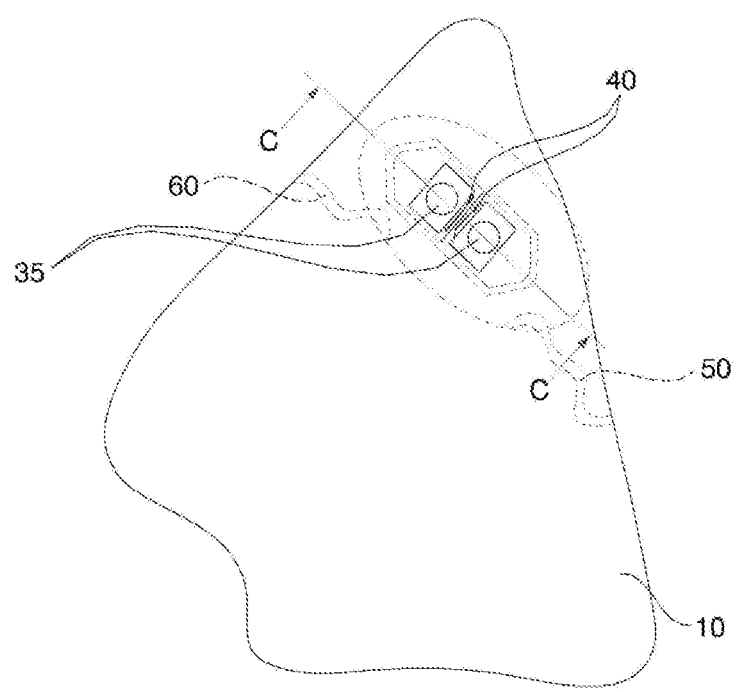
FIG. 7 is a front view illustrating a state in which the airbag cushion according to the first exemplary embodiment of the airbag for a vehicle of FIG. 1 is fully deployed.
Figure 8:
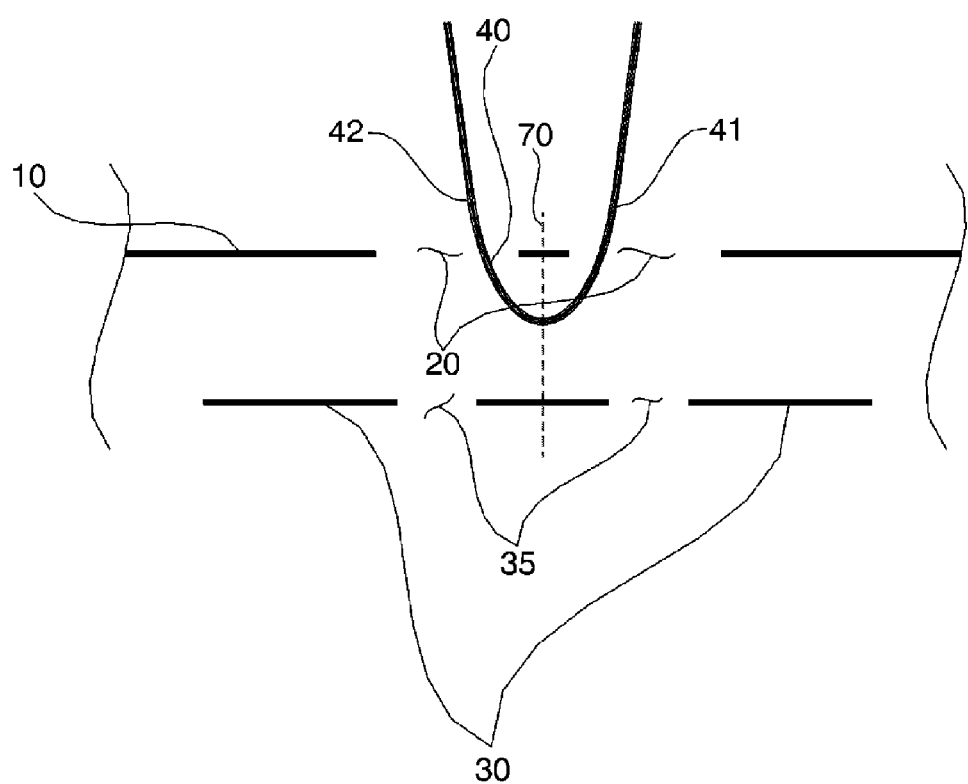
FIG. 8 is a cross-sectional view taken along line C-C of FIG. 7.
Figure 9:
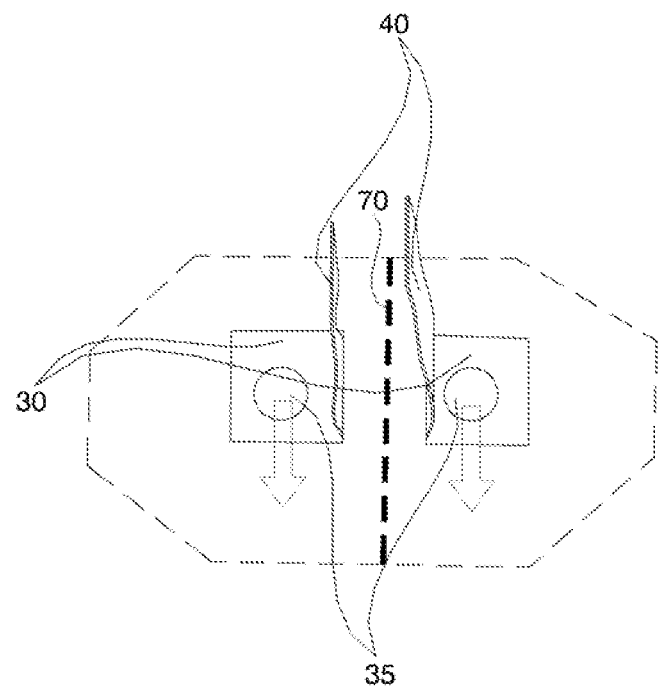
FIG. 9 is a partially enlarged view illustrating a state in which a part of FIG. 7 is enlarged.

FIG. 1 is a front view illustrating a state when a part of an airbag cushion of a first exemplary embodiment of an airbag for a vehicle according to the present invention is deployed, FIG. 2 is a cross-sectional view taken along line A-A of FIG. 1, FIG. 3 is a partially enlarged view illustrating a state in which a part of FIG. 1 is enlarged, FIG. 4 is a front view illustrating a state in which the airbag cushion of FIG. 1 is being deployed, FIG. 5 is a cross-sectional view taken along line B-B of FIG. 4, FIG. 6 is a partially enlarged view illustrating a state in which a part of FIG. 4 is enlarged, FIG. 7 is a front view illustrating a state in which the airbag cushion according to the first exemplary embodiment of the airbag for a vehicle of FIG. 1 is fully deployed, FIG. 8 is a cross-sectional view taken along line C-C of FIG. 7, and FIG. 9 is a partially enlarged view illustrating a state in which a part of FIG. 7 is enlarged.

Referring to FIGS. 1 to 9, an airbag for a vehicle according to an exemplary embodiment of the present invention further includes an airbag cushion 10 which is deployed toward a passenger by gas pressure when gas flows into the airbag cushion 10, a vent guide 30, a vent cover 40, a first cord 50, and a second cord 60.

In the present invention, the airbag cushion 10 is exemplified as an airbag for a front passenger seat, but the present invention is not limited thereto.

Referring to FIGS. 1 to 9, when a control unit (not illustrated) transmits a collision signal to an inflator (not illustrated) by collision or impact that is applied to a vehicle, the airbag cushion 10 is deployed toward a passenger by pressure of gas that jets out from the inflator, and a plurality of vent holes 20, which discharges gas to the outside, is formed in the airbag cushion 10.

The plurality of vent holes 20, which is formed in the airbag cushion 10, discharges the gas in the airbag cushion 10 to the outside so as to adjust internal pressure in the airbag cushion 10. A single or a plurality of vent holes 20 may be formed in the airbag cushion 10, and in a case in which a plurality of vent holes 20 is formed, sizes of the vent holes 20 may be different from each other so that the gas in the airbag cushion 10 is easily discharged. In the exemplary embodiment illustrated in FIGS. 1 to 9, the vent hole 20 is formed in a quadrangular shape, but the vent hole 20 may be formed in other shapes.

The vent guide 30, which has guide holes 35 that correspond to the plurality of vent holes 20, is disposed in the airbag cushion 10.

The vent guide 30 may be made of a material the same as a material of the airbag cushion 10, the vent guide 30 may elongate to have a rectangular shape, and widths of both end portions of the vent guide 30 may become narrower toward both ends thereof.

The vent guide 30 is disposed in the airbag cushion 10 while centers of the plurality of vent holes 20 and centers of the guide holes 35 are matched to each other. The vent cover 40 is disposed between the airbag cushion 10 and the vent guide 30, and a center portion of the vent cover 40 is fixed to the airbag cushion 10 together with the vent guide 30 by stitching 70. The vent guide 30 and the vent cover 40 may be fixed to the airbag cushion 10 by other fixing means instead of the stitching 70.

The vent guide 30 is stitched to the airbag cushion 10 along an outer periphery of the vent guide 30.

When the vent guide 30 is connected to the airbag cushion 10, the vent guide 30 is securely connected to the airbag cushion 10 so as not to be separated from the airbag cushion 10 by gas pressure in the airbag cushion 10.

The guide hole 35 may be formed to be smaller than the vent hole 20.

The vent cover 40 may elongate to have a rectangular shape, and widths of both end portions 41 and 42 of the vent cover 40 may become narrower toward both ends thereof. A width of the vent cover 40 is smaller than a width of the vent hole 20, and greater than a width of the guide hole 35. As illustrated in FIGS. 2 and 3, in an initial step of deploying the airbag cushion, the vent cover 40 is disposed between the vent guide 30 and the airbag cushion 10 so that a part of the vent cover 40 protrudes though the plurality of vent holes 20. Therefore, at the initial period of deploying the airbag cushion 10, the gas flowing into the airbag cushion 10 is discharged to the outside through the guide holes 35, the vent holes 20, and space portions 15 formed between protruding portions of the vent cover 40 and the airbag cushion 10.

One side 41 of the vent cover 40 is connected to one end portion 51 of the first cord 50 by breakable stitching 81, and the other side 42 of the vent cover 40 is connected to one end portion 61 of the second cord 60 by breakable stitching 82. The other end portion (not illustrated) of the first cord 50, which is opposite to one side 41 of the vent cover, is connected to a front surface portion of the airbag cushion 10, and the other end portion (not illustrated) of the second cord 60, which is opposite to the other side 42 of the vent cover, is connected to a rear surface portion of the airbag cushion 10. Meanwhile, the first cord 50 and the second cord 60 may be connected to surfaces, which are opposite to the airbag cushion 10, for example, to upper and lower surfaces, or left and right surfaces of the airbag cushion 10, respectively.

In addition, the first cord 50 and the second cord 60 may be connected any side airbag cushion 10 if the first cord 50 and second cord 60 can pull the vent cover 40 in outside directions of both ends of the vent cover 40 when the airbag cushion 10 is displayed.

In a case in which the first cord 50 and the second cord 60 are connected to front and rear surface portions of the airbag cushion 10, the first cord 50 and the second cord 60 are pulled in front and rear directions when the airbag cushion 10 is deployed, and thus tension is applied to both the sides 41 and 42 of the vent cover 40 in an outward direction. Therefore, as illustrated in FIG. 5, the portions of the vent cover 40, which protrude from the vent holes 20, are inserted into the vent holes 20 so as to close the guide holes 35. Accordingly, during an intermediate period of deploying the airbag cushion 10, air in the airbag cushion 10 may not be discharged to the outside of the airbag cushion 10, thereby facilitating the deployment of the airbag cushion.

Next, when the airbag cushion 10 continues to be deployed such that a predetermined amount or more of tension is applied to both the sides 41 and 42 of the vent cover 40 by the first cord 50 and the second cord 60, connecting portions, which are formed by the stitching 81 and 82 and connect both the sides 41 and 42 of the vent cover 40 to one end portion 51 of the first cord 50 and one end portion 61 of the second cord 60, are broken. Therefore, as illustrated in FIG. 8, both the sides 41 and 42 of the vent cover 40 of the airbag cushion 10 protrude from the plurality of vent holes 20 to the outside, respectively, and the guide holes 35 and the vent holes 20 are opened.

Therefore, at a final period of deploying the airbag cushion 10, the high-pressure gas flowing into the airbag cushion 10 is discharged to the outside of the airbag cushion 10 through the guide holes 35 and the vent holes 20.

Figure 10:
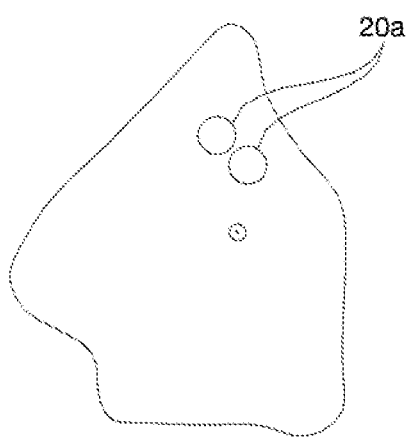
FIG. 10 is a front view illustrating a second exemplary embodiment in which vent holes are different from vent holes of the airbag cushion of FIG. 1.
Figure 11:
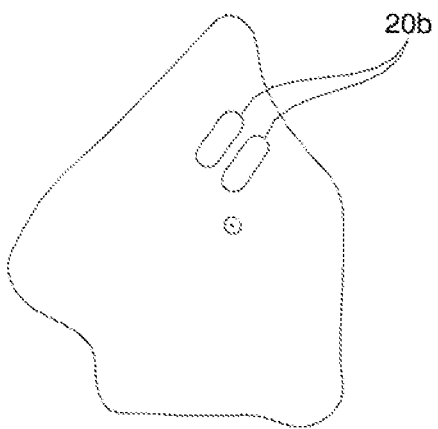
FIG. 11 is a front view illustrating a third exemplary embodiment of FIG. 10.
Figure 12:
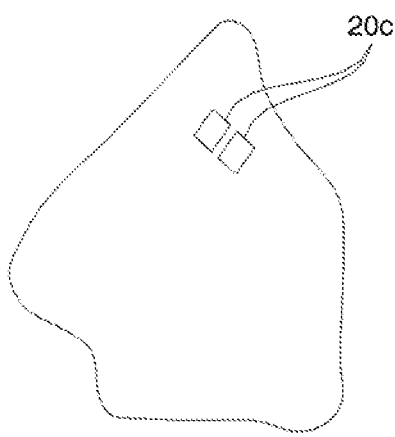
FIG. 12 is a front view illustrating a fourth exemplary embodiment of FIG. 10.

As illustrated in FIGS. 10 to 12, the plurality of vent holes 20 may be formed in a circular shape 20a, an elliptical shape 20b, or a square shape 20c.

Figure 13:
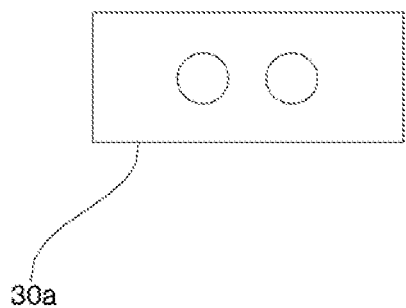
FIG. 13 is a front view illustrating a second exemplary embodiment in which guide holes are different from guide holes of the airbag cushion of FIG. 1.
Figure 14:
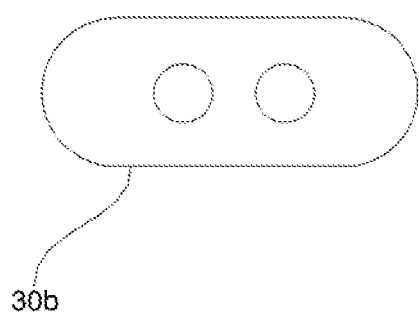
FIG. 14 is a front view illustrating a third exemplary embodiment of FIG. 13.

As illustrated in FIGS. 13 and 14, the vent guide 30 may be formed in a quadrangular shape, or a rectangular shape 30b whose one end and the other end are in a semicircular shape 30b.

An operation of the airbag for a vehicle according to the present invention, which is configured as described above, will be described below.

Referring to FIGS. 1 to 9, the vent guide 30 having the guide holes 35 is disposed in the airbag cushion 10 having the vent holes 20, the vent cover 40 is disposed between the airbag cushion 10 and the vent guide 30, and the airbag cushion 10 is folded and accommodated in a side seat of the front passenger seat in a state in which parts of the vent cover 40 protrude from the vent holes 20 to the outside of the airbag cushion 10.

One side 41 of the vent cover 40 is connected to one end portion 51 of the first cord 50, the other side 42 of the vent cover 40 is connected to one end portion 61 of the second cord 60, the other end portion of the first cord 50 is connected to the front surface side of the airbag cushion 10, and the other end portion of the second cord 60 is connected to the rear surface side of the airbag cushion 10.

Referring to FIGS. 1 to 3, the airbag cushion 10 is deployed by impact that is applied to the vehicle. The initial period of deploying the airbag cushion 10, that is, a period within 30 ms from when the airbag cushion is initially deployed is a period when tension begins to occur at the first cord 50 and the second cord 60, and at the initial period of deploying the airbag cushion 10, at least a part of the protruding portion of the vent cover 40 protrudes to the outside of the vent hole 20.

Therefore, at the initial period of deploying the airbag cushion, the gas in the airbag cushion 10 is discharged to the outside of the airbag cushion 10 through the guide holes 35, the vent holes 20, and the space portions 15 formed between the protruding portions of the vent cover 40 and the airbag cushion 10. Therefore, at the initial period of deploying the airbag cushion, the gas is discharged to the outside through the vent holes 20, thereby reducing injury to a small child caused by impact of the airbag cushion.

Next, referring to FIGS. 4 to 6, during the intermediate period of deploying the airbag cushion 10, that is, during a period between approximately 30 ms and 60 ms from when the airbag cushion 10 is initially deployed, tension of the first cord 50 and the second cord 60 is gradually increased.

Therefore, the first cord 50 and the second cord 60 pull both the sides 41 and 42 of the vent cover 40 such that the protruding portions of the vent cover 40 are unfolded and inserted into the vent holes 20 so as to close the guide holes 35. This step is a step immediately before a dummy used for an impact test comes into contact with the airbag cushion. In this case, the gas in the airbag cushion 10 may not be discharged to the outside such that the airbag cushion 10 is quickly deployed, and the connecting portions, which are formed by the stitching 81 and 82 and connect both the sides 41 and 42 of the vent cover 40 to the first cord 50 and the second cord 60, begin to be broken.

Next, referring to FIGS. 7 to 9, when the airbag cushion 10 is fully deployed, that is, at the final period of deploying the airbag cushion 10, which is a period after approximately 60 ms has passed from when the airbag cushion is initially deployed, the connection portions, which are formed by the stitching 81 and 82, are completely broken such that both the sides 41 and 42 of the vent cover 40 protrude to the outside of the airbag cushion 10 through the vent holes 20, respectively.

When both the sides 41 and 42 of the vent cover 40 protrude to the outside of the airbag cushion 10, the guide holes 35 and the vent holes 20 are opened such that the internal gas in the airbag cushion 10 is discharged to the outside of the airbag cushion 10 through the guide holes 35 and the vent holes 20. Therefore, internal pressure in the airbag cushion 10 is decreased, and impact, which affects the occupant, is reduced, such that time taken while the occupant collides with the airbag cushion is lengthened, thereby minimizing injury to the occupant caused by the deployment of the airbag cushion.

While the exemplary embodiments of the present invention have been illustrated and described above, the present invention is not limited to the aforementioned specific exemplary embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

What is claimed is:

1. An airbag for a vehicle, comprising:
   an airbag cushion which has a vent hole formed to discharge gas flowing into the airbag cushion to the outside;
   a vent guide which has a guide hole formed to guide the gas flowing into the airbag cushion to the vent hole, and is disposed in the airbag cushion; and
   a vent cover which is disposed between the vent guide and the airbag cushion, allows the guide hole and the vent hole to be opened at an initial period of deploying the airbag cushion and at a final period of deploying the airbag cushion, and allows at least one of the guide hole and the vent hole to be closed during an intermediate period of deploying the airbag cushion.

2. The airbag of claim 1, further comprising:
   a first cord which has one end portion connected to one side of the vent cover by a first connecting portion, and the other end portion connected to the airbag cushion.

3. The air bag of claim 2, further comprising:
   a second cord which has one end portion connected to the other side of the vent cover by a second connecting portion, and the other end portion connected to the airbag cushion.

4. The airbag of claim 3, wherein the first cord and the second cord are disposed to be opposite to each other on the basis of the vent cover.

5. The airbag of claim 3, wherein the first cord is connected to a front surface side of the airbag cushion, and the second cord is connected to a rear surface side of the airbag cushion.

6. The airbag of claim 2, wherein a part of the vent cover includes a protruding portion that protrudes to the outside of the vent hole before the airbag cushion is deployed, and the protruding portion is inserted into the vent hole so as to close the guide hole by tension applied to the first connecting portion during the intermediate period of deploying the airbag cushion.

7. The airbag of claim 6, wherein when a predetermined amount or more of tension is applied to the first cord, the first connecting portion is broken to open the guide hole.

8. The airbag of claim 7, wherein when the first connecting portion is broken, a part of the vent cover protrudes to the outside of the vent hole.

9. The airbag of claim 1, wherein a width of the vent cover is smaller than a width or a diameter of the vent hole.

10. The airbag of claim 1, wherein a width of the vent cover is greater than a width or a diameter of the guide hole.

11. The airbag of claim 1, wherein the vent hole and the guide hole are formed in plural numbers.

12. The airbag of claim 1, wherein the vent cover is connected to the airbag cushion by stitching.

13. The airbag of claim 1, wherein an edge of the vent guide is connected to a front surface side of the airbag cushion by stitching.

14. The airbag of claim 1, wherein a width or a diameter of the guide hole is smaller than that of the vent hole.

15. The airbag of claim 1, wherein the vent hole is formed in a circular shape, an elliptical shape, or a square shape.

16. The airbag of claim 1, wherein the guide hole is formed in a circular shape.

17. The airbag of claim 1, wherein the vent cover is formed in a rectangular shape.

* * * * *